United States Patent [19]
Kaneyuki et al.

[11] Patent Number: 5,444,355
[45] Date of Patent: Aug. 22, 1995

[54] CHARGING GENERATOR FOR A VEHICLE

[75] Inventors: Kazutoshi Kaneyuki; Shinji Nishimura, both of Himeji, Japan

[73] Assignee: Mitsubishi Denki Kabushiki Kaisha, Tokyo, Japan

[21] Appl. No.: 934,274

[22] Filed: Aug. 25, 1992

[30] Foreign Application Priority Data

Sep. 26, 1991 [JP] Japan .................... 3-276616

[51] Int. Cl.⁶ ............................. H02K 11/00
[52] U.S. Cl. ......................... 322/58; 322/90
[58] Field of Search ................ 322/58, 86, 89, 90

[56] References Cited

U.S. PATENT DOCUMENTS

| | | |
|---|---|---|
| 3,558,904 | 1/1971 | Kanngiesser . |
| 3,758,842 | 9/1973 | Kudlacik ............ 322/90 X |
| 3,768,002 | 10/1973 | Drexler et al. ........ 322/90 X |
| 3,771,045 | 11/1973 | Storz ................. 322/28 |
| 3,793,544 | 2/1974 | Baumgartner et al. ... 322/90 X |
| 4,692,684 | 9/1987 | Schaeffer ............ 322/90 |
| 4,780,659 | 10/1988 | Bansal et al. ........ 322/58 |
| 4,788,486 | 11/1988 | Mashino et al. ....... 322/90 X |
| 5,274,322 | 12/1993 | Hayashi et al. ....... 322/90 |

FOREIGN PATENT DOCUMENTS

| | | |
|---|---|---|
| 0057730 | 8/1982 | European Pat. Off. . |
| 2101270 | 7/1972 | Germany . |
| 63-92243 | 4/1988 | Japan . |
| 2001486 | 1/1979 | United Kingdom . |

OTHER PUBLICATIONS

Japanese Unexamined Patent Publication No. 79796/1992, published on Mar. 13, 1992.
Japanese Unexamined Patent Publication No. 42759/1992, published on Feb. 13, 1992.

Primary Examiner—Kristine L. Kincaid
Attorney, Agent, or Firm—Sughrue, Mion, Zinn, Macpeak & Seas

[57] ABSTRACT

A charging generator for a vehicle comprises a three-phase a.c. generator in which first and second armature windings are provided so that the waveforms of the a.c. voltages produced in the first and second windings have a phase difference of 30° in electrical angle, each of the output voltages are rectified in each rectifier, and the output side of the rectifiers are connected in parallel so that the output voltages are composed, whereby the height of ripple of the produced d.c. voltage can be reduced.

1 Claim, 2 Drawing Sheets

CHARGING GENERATOR FOR A VEHICLE

BACKGROUND OF THE INVENTION

The present invention relates to a charging generator for a vehicle which rectifies an a.c. voltage generated from an a.c. generator driven by the revolution of the engine and applies a d.c. current obtained by rectifying the a.c. voltage to a direct current load.

In a vehicle such as an automobile, a three-phase a.c. generator is driven by the revolution of the engine to thereby produce a three-phase a.c. voltage and the three-phase a.c. voltage is rectified into a d.c. voltage which is used for charging the battery and actuating a direct current load.

FIG. 4 is a circuit diagram of a conventional charging generator for a vehicle in which reference numeral 1 designates a three-phase a.c. generator connected to an output shaft of the engine of the vehicle. In the generator, an armature winding 2 wound around the armature iron core of the stator has a three-phase Y-connection, and a magnetic field winding 3 is wound around the magnetic pole iron core of the rotor. Numeral 4 designates a rectifier for rectifying the three-phase a.c. voltage of the a.c. generator 1 into a d.c. voltage, numeral 5 designates a voltage regulator to detect an output voltage from the rectifier and to adjust a field current so that the output voltage assumes a predetermined level, numeral 6 designates a battery, numeral 7 designates a d.c. load, and numeral 9 designates an output terminal of rectifier 4.

In the three-phase a.c. generator 1, an a.c. voltage is produced in each phase of the armature winding 2.

The a.c. voltage is rectified in the rectifier 4 into a d.c. voltage, which has a waveform A as shown in FIG. 5 in which there is a ripple having a magnitude of pulsation of $\Delta V$. The height of the ripple becomes large as the load factor of the a.c. generator is large, or the revolution speed of the generator 1 is large.

In the conventional charging generator for a vehicle wherein the height of the ripple of the output voltage is large, there were problems as follows. (a) the output voltage of the charging generator is applied to the battery 6 as an average direct current voltage, which is controlled by the voltage regulator 5 so as to charge the battery 5 in a predetermined value. A large magnitude of pulsation in the ripple causes high peaks in the ripple (the maximum voltage), whereby the service life of the battery 6 is decreased, (b) erroneous operations in electronic devices mounted on the vehicle are induced, and (c) noise in radio devices mounted on the vehicle are large.

It is an object of the present invention to provide a charging generator for a vehicle capable of reducing the height of ripple of an output d.c. voltage from a rectifier, extending the service life of a battery and suppressing erroneous operations of electronic devices and a large amount of noise is induced in radio devices.

In accordance with the present invention, there is provided a charging generator for a vehicle comprising a three-phase a.c. generator in which a rotor having a magnetic field is rotated according to the revolution of the engine of the vehicle to thereby produce a three-phase a.c. voltage in an armature winding, and a rectifier for rectifying the three-phase a.c. voltage into a d.c. voltage to be supplied to a load, the charging generator being characterized in that the armature winding has two winding systems, a first armature winding having a Y-connection and a second armature winding having a $\Delta$-connection;

the first and second armature windings are respectively connected to first and second rectifiers, and the output sides of the both rectifiers are connected in parallel to each other so that an output voltage from the rectifiers is applied to the load.

In accordance with the present invention, there is provided a charging generator for a vehicle comprising a three-phase a.c. generator in which a rotor having a magnetic field is rotated according to the revolution of the engine of the vehicle to thereby produce a three-phase a.c. voltage in an armature winding, and a rectifier for rectifying the three-phase a.c. voltage into a d.c. voltage to be supplied to a load, the charging generator being characterized in that the three-phase a.c. generator has two pairs of armature iron cores and rotor fields; a first three-phase armature winding is wound around the first armature iron core; a second three-phase armature winding is wound around the second armature iron core; the position in the circumferential direction of the pair of the first armature winding and the rotor field is shifted by an electrical angle of 30° to the position in the circumferential direction of the pair of the second armature winding and the rotor field; the first and second armature windings are respectively connected to first and second rectifiers, and the output sides of the both rectifiers are connected in parallel to each other so that an output d.c. voltage is applied to the load.

DETAILED DESCRIPTION OF THE PREFERRED EMBODIMENT

In the following, preferred embodiments of the charging generator for a vehicle according to the present invention will be described with reference to the drawings.

Figure 1:
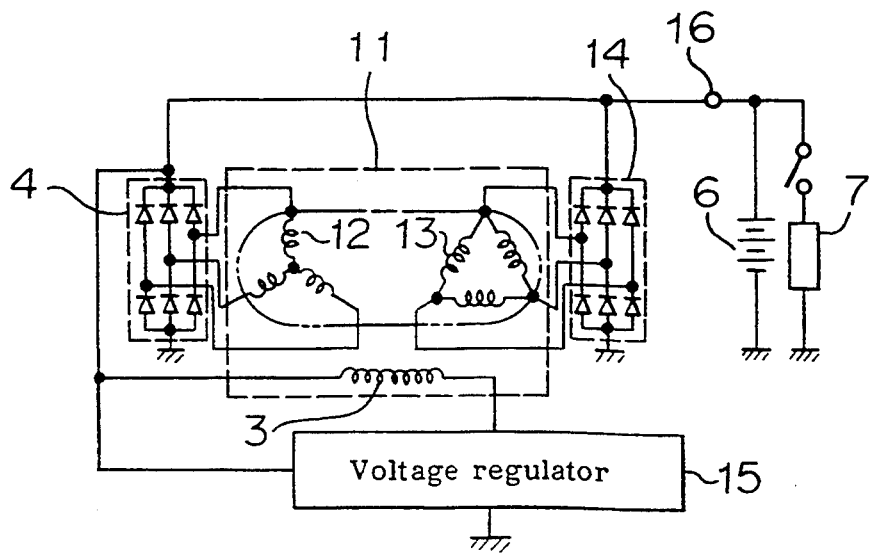
FIG. 1 is a circuit diagram of an embodiment of the charging generator for a vehicle according to the present invention.

FIG. 1 is a circuit diagram showing an embodiment of the charging generator for a vehicle of the present invention. In FIG. 1, reference numeral 11 designates a three-phase a.c. generator connected to an output shaft of the engine of the vehicle so as to be driven thereby. The generator has a first armature winding 12 having a Y-connection and a second armature winding 13 having a $\Delta$-connection which are wound around a common armature iron core of a stator. Numeral 3 designates a magnetic field winding provided on a magnetic pole iron core of the rotor opposing the armature iron core, which is commonly used for the first and second armature windings 12, 13. Numeral 15 designates a voltage regulator to detect the output voltage of a first rectifier 4 and to regulate an exciting current so that the output voltage has a predetermined value. A three-phase a.c. voltage from the first armature winding 12 is rectified to be a d.c. voltage by the first rectifier 4. Further, a three-phase a.c. voltage from the second armature winding 13 is rectified to be a d.c. voltage by a second rectifier 14. The output sides of the rectifiers 4, 14, which are connected in parallel, have an output terminal 16 from which a direct current voltage is applied to a battery 6 and a direct current load 7.

Figure 2:
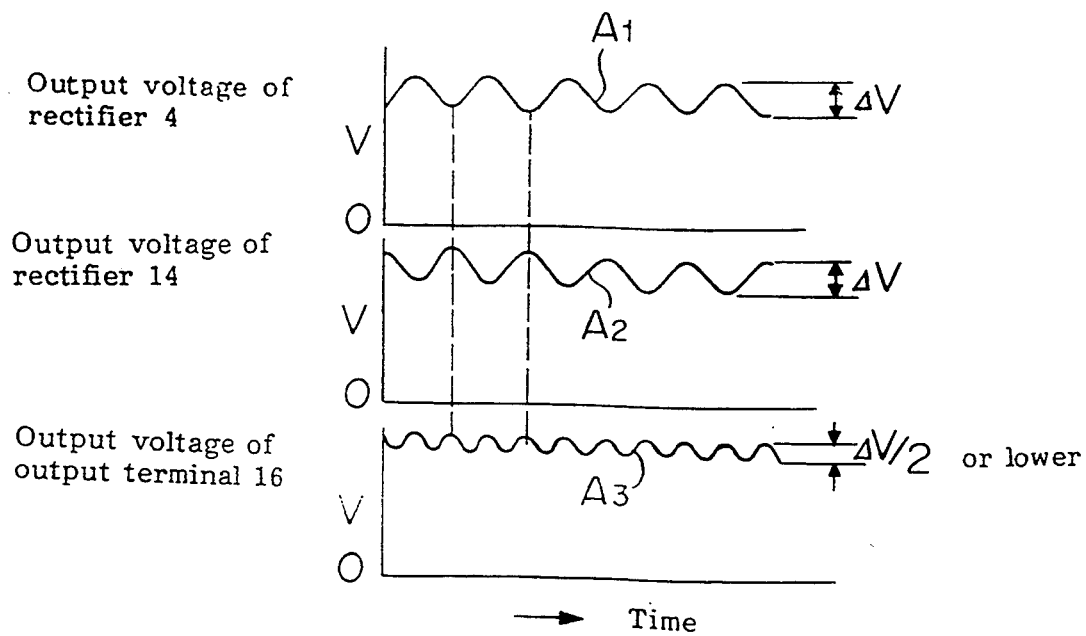
FIG. 2 is a diagram showing the waveforms of output voltages from the charging generator shown in FIG. 1.

FIG. 2 is a diagram showing waveforms of the output voltages of the rectifiers in the charging generator shown in FIG. 1. Symbol $A_1$ represents the voltage waveform outputted from the rectifier 4 and symbol $A_2$ represents the waveform of the output voltage of the rectifier 14 wherein the waveforms of the output voltages respectively include ripples having a magnitude of pulsation of $\Delta V$, but there is a difference of phase in electrical angle of 30° between the both waveforms. This is because in considering the phase difference between the phase voltage and the line voltage of the armature winding, the armature winding 12 having a Y-connection is 30° advanced while the armature winding 13 having a Δ-connection has the same phase. Accordingly, the waveform of the d.c. voltage outputted from the output terminal 16 assumes the waveform indicated by $A_3$ which is formed by the parallel composition of the waveforms $A_1$ and $A_2$. In the composite waveform $A_3$, although the frequency of the ripple is doubled, the height of the ripple can be reduced to about half ($1/2\Delta V$).

Figure 3:
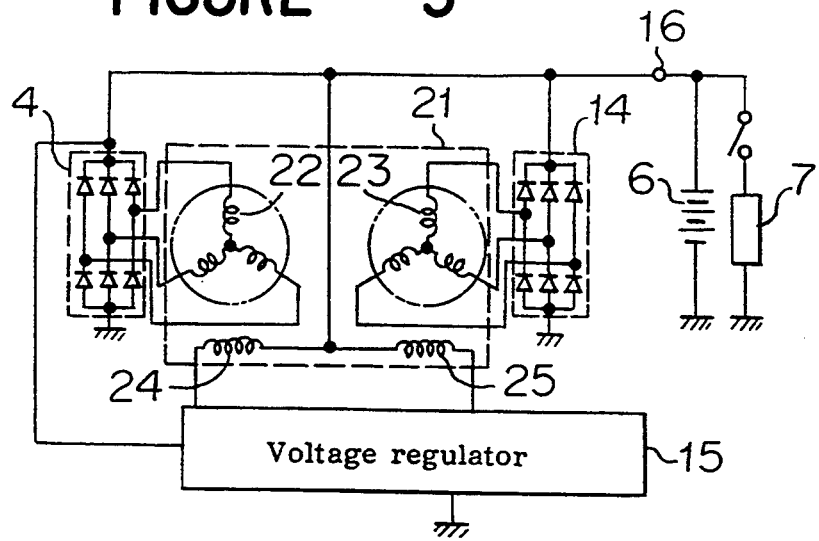
FIG. 3 is a circuit diagram of a second embodiment of the charging generator for a vehicle according to the present invention.
Figure 4:
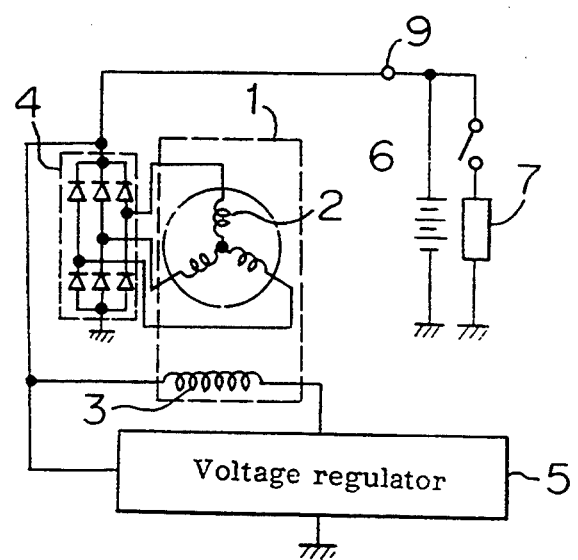
FIG. 4 is a circuit diagram of a conventional charging generator for a vehicle.
Figure 5:
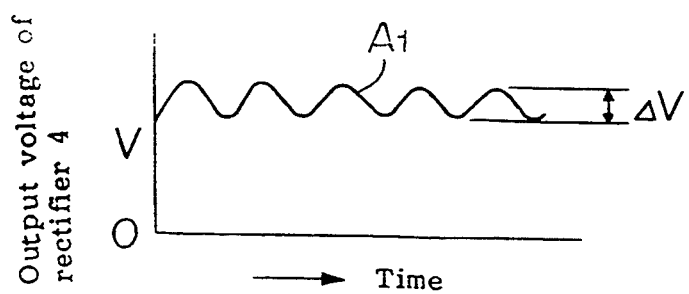
FIG. 5 is a diagram showing an output voltage from the conventional charging generator.

FIG. 3 is a circuit diagram of a second embodiment of the charging generator for a vehicle according to the present invention. In FIG. 3, a three-phase a.c. generator 21 comprises a first pair of a first armature in the stator and a first magnetic field in the rotor opposing thereto, and a second pair of a second armature in the stator and a second magnetic field in the rotor opposing thereto wherein the first and second armatures and the first and second magnetic fields are respectively provided on a common stator frame and a common rotary shaft in the axial direction of the generator. Numeral 22 designates a first armature winding having a Y-connection which is formed on a first armature iron core, numeral 23 designates a second armature winding having a Y-connection formed on a second armature iron core. Numeral 24 designates a first field winding formed on a first field iron core in the rotor, which opposes the first armature iron core, and numeral 25 designates a second field winding formed on a second field iron core in the rotor, which opposes the second armature iron core. Numeral 15 designates a voltage regulator to detect the output voltage of the rectifier 4 so that each exciting current in the first and second field windings 24, 25 is adjusted so as to obtain a predetermined value of the output voltage. A three-phase a.c. voltage from the first armature winding 22 is rectified in the first rectifier 4, and a three-phase a.c. voltage from the second armature winding is rectified in a second rectifier 14. The output sides of the rectifiers 4, 14 are connected in parallel to obtain a d.c. output voltage as the parallel composition of the output voltages of the rectifiers 4, 14. The d.c. output voltage is applied to a load through an output terminal.

In the positional relationship of magnetic pole between the first pair of the first armature and magnetic field and the second pair of the second armature and magnetic field, they are adjusted to have a phase difference of 30° in electrical angle by shifting either the armature winding side or the magnetic field side.

In the second embodiment, since there is a phase difference of 30° in electrical angle between the output voltages of the armature windings 22, 23, the height of ripple in the waveform $A_3$ of the output voltage appearing at the output terminal 16, the output voltage being obtained by composing the output voltages of the rectifiers 4, 14 which are connected in parallel, can be reduced.

Thus, in accordance with the present invention, the waveforms of the a.c. voltages produced in first and second armature windings of a three-phase a.c. generator have a phase difference of 30° in electrical angle, the d.c. voltages being respectively rectified in rectifiers, and the output sides of the rectifiers are connected in parallel so that the output voltages are composed to be applied to a load. Accordingly, the height of ripple of the output d.c. voltage can be reduced. As a result, the service life of the battery can be extended, and erroneous operations of electronic devices and noise induced in a radio device mounted on the vehicle can be minimized.

We claim:

1. In a charging generator for a vehicle comprising a three-phase a.c. generator in which a rotor having a magnetic field is rotated according to the revolution of an engine of the vehicle to thereby produce a three-phase a.c. voltage in an armature winding, and the three-phase a.c. voltage is rectified into a d.c. voltage to be supplied to a load, said charging generator being characterized in that the three-phase a.c. generator comprises two sets of armature iron cores and rotor fields;

a first three-phase armature winding is wound around a first of the armature iron cores;

a second three-phase armature winding is wound around a second of the armature iron cores;

the position in the circumferential direction of the set of the first armature winding and a first of the rotor fields is shifted by an electrical angle of 30° with respect to the position in the circumferential direction of the set of the second armature winding and a second of the rotor fields;

the first and second armature windings are respectively connected to first and second rectifiers, and the output sides of both of the first and second rectifiers are connected in parallel to each other so that an output d.c. voltage of the first and second rectifiers is applied to the load and ripple effects in the output voltage are minimized.

* * * * *